US011908454B2

(12) United States Patent
Thomas et al.

(10) Patent No.: US 11,908,454 B2
(45) Date of Patent: Feb. 20, 2024

(54) INTEGRATING TEXT INPUTS FOR TRAINING AND ADAPTING NEURAL NETWORK TRANSDUCER ASR MODELS

(71) Applicant: International Business Machines Corporation, Armonk, NY (US)

(72) Inventors: Samuel Thomas, White Plains, NY (US); Hong-Kwang Kuo, Pleasantville, NY (US); Brian E. D. Kingsbury, Cortlandt Manor, NY (US); George Andrei Saon, Stamford, CT (US); Gakuto Kurata, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 17/539,752

(22) Filed: Dec. 1, 2021

(65) Prior Publication Data

US 2023/0169954 A1 Jun. 1, 2023

(51) Int. Cl.
*G10L 15/06* (2013.01)
*G06N 3/08* (2023.01)
*G10L 21/10* (2013.01)

(52) U.S. Cl.
CPC .............. *G10L 15/063* (2013.01); *G06N 3/08* (2013.01); *G10L 21/10* (2013.01)

(58) Field of Classification Search
CPC ....... G10L 15/063; G10L 21/10; G10L 15/02; G10L 15/16; G06N 3/08
See application file for complete search history.

(56) References Cited

U.S. PATENT DOCUMENTS

| | | | |
|---|---|---|---|
| 10,186,252 B1 | 1/2019 | Mohammadi | |
| 10,460,749 B1 | 10/2019 | Ru | |
| 10,902,841 B2 | 1/2021 | Liu | |
| 11,017,763 B1 | 5/2021 | Aggarwal | |
| 11,056,099 B2 | 7/2021 | Zhou | |
| 2019/0318754 A1 | 10/2019 | Le Roux | |
| 2020/0051583 A1* | 2/2020 | Wu | G10L 13/047 |
| 2020/0357388 A1 | 11/2020 | Zhao | |
| 2021/0027784 A1 | 1/2021 | Li | |
| 2021/0097976 A1 | 4/2021 | Chicote | |

(Continued)

FOREIGN PATENT DOCUMENTS

| | | |
|---|---|---|
| CN | 113129867 A | 7/2021 |
| CN | 113380239 A * | 9/2021 |

(Continued)

OTHER PUBLICATIONS

Hayashi et al., "Back-Translation-Style Data Augmentation For End-To-End ASR", Cornell University Library, arXiv:1807.10893v1 [cs.CL], Jul. 28, 2018, 8 pgs.

(Continued)

*Primary Examiner* — Yogeshkumar Patel
(74) *Attorney, Agent, or Firm* — Caleb D. Wilkes

(57) ABSTRACT

A processor-implemented method trains an automatic speech recognition system using speech data and text data. A computer device receives speech data, and generates a spectrogram based on the speech data. The computing device receives text data associated with an entire corpus of text data, and generates a textogram based upon the text data. The computing device trains an automatic speech recognition system using the spectrogram and the textogram.

20 Claims, 9 Drawing Sheets

(56) References Cited

U.S. PATENT DOCUMENTS

| | | | |
|---|---|---|---|
| 2021/0110810 A1* | 4/2021 | Ping | G06F 9/30003 |
| 2021/0151029 A1 | 5/2021 | Gururani | |
| 2021/0217404 A1 | 7/2021 | Jia | |
| 2021/0225358 A1 | 7/2021 | Monge Alvarez | |
| 2021/0225369 A1 | 7/2021 | Hu | |
| 2021/0241753 A1 | 8/2021 | Kumar | |
| 2021/0350786 A1* | 11/2021 | Chen | G10L 13/00 |
| 2022/0005457 A1* | 1/2022 | Balakrishnan | G10L 15/16 |

FOREIGN PATENT DOCUMENTS

| | | |
|---|---|---|
| CN | 113506562 A | 10/2021 |
| TW | 201828279 A | 8/2018 |
| TW | 202001874 A | 1/2020 |

OTHER PUBLICATIONS

Mell et al., "The NIST Definition of Cloud Computing", National Institute of Standards and Technology, Special Publication 800-145, Sep. 2011, pp. 1-7.

Nakayama et al., "Zero-Shot Code-Switching ASR And TTS With Multilingual Machine Speech Chain", Automatic Speech Recognition and Understanding Workshop (ASRU), Dec. 2019, 8 pgs.

Pylkkönen et al., "Fast text-only Domain Adaption of RNN-transducer Prediction Network", Cornell University Library, arXiv:2104.11127v2 [cs.CL], Jun. 9, 2021, 5 pgs.

Ren et al., "Almost Unsupervised Text To Speech And Automatic Speech Recognition", Proceedings of the 36th International Conference on Machine Learning, Long Beach, CA, PMLR 97, Jun. 2019, Cornell University Library, arXiv:1905.06791v3, [eess.AS], Jul. 26, 2020, 11 pgs.

Tjandra et al., "Combination of Two-Dimensional Cochleogram And Spectrogram Features For Deep Learning-Based ASR," 2015 IEEE ICASSP, Apr. 19-24, 2015, pp. 4525-4529.

Xu et al., "LRSpeech: Extremely Low-Resource Speech Synthesis And Recognition", KDD '20, Aug. 23-27, 2020, Virtual Event, CA, USA, Cornell University Library, arXiv:2008.03687v1 [eess.AS], Aug. 9, 2020, 11 pgs.

Almost Unsupervised Text To Speech And Automatic Speech Recognition.

Back-Translation-Style Data Augmentation For End-To-End ASR.

Combination Od Two-Dimensional Cochleogram And Spectrogram Features For Deep Learning-Based ASR.

LRSpeech: Extremely Low-Resource Speech Synthesis And Recognition.

Mell et al., The NIST Definition of Cloud Computing, NIST, Sep. 2011.

Pylkkonen et al., "Fast text-only domain adaption of RNN-transducer prediction network", arXiv:2104.11127, Apr. 2021.

Zero-Shot Code-Switching ASR And TTS With Multilingual Machine Speech Chain.

Taiwan Patent Office, "Notification of Office Action," Taiwan Application No. 111132423, dated Jun. 16, 2023, 15 pages (8 pages thereof original Office Action, 7 pages thereof English translation).

Thomas et al., "Integrating Text Inputs for Training and Adapting Neural Network Transducer ASR Models", Taiwan Application No. 111132423, Filing Date: Aug. 29, 2022, 84 pages, claims priority on U.S. Appl. No. 17/539,752 (present application).

* cited by examiner

301

| SP | F1 SP | F1 SP+TXT |
|---|---|---|
| 0 HRS (0%) | ---- | 45.05 |
| 1 HRS (10%) | 47.88 | 53.84 |
| 2.5 HRS (25%) | 51.42 | 54.02 |
| 5 HRS (50%) | 53.13 | 55.33 |
| 10 HRS (100%) | 53.57 | 54.95 |

302

| SP | Acc. SP | Acc. SP+TXT |
|---|---|---|
| 0 HRS (0%) | ---- | 76.97 |
| 1.7 HRS (10%) | 72.46 | 88.34 |
| 4.4 HRS (25%) | 82.67 | 89.32 |
| 8.7 HRS (50%) | 87.05 | 89.56 |
| 17 HRS (100%) | 89.06 | 89.59 |

303

| SP | Acc. SP | Acc. SP+TXT |
|---|---|---|
| 0 HRS (0%) | ---- | 90.59 |
| 0.95 HRS (10%) | 84.77 | 92.16 |
| 2.4 HRS (25%) | 88.47 | 93.06 |
| 4.8 HRS (50%) | 92.50 | 95.07 |
| 9.6 HRS (100%) | 96.42 | 96.75 |

304

| SP | F1 SP (+aug) | Acc. SP+TXT (+aug) |
|---|---|---|
| 0 HRS (0%) | ---- | 85.95 |
| 0.95 HRS (10%) | 46.25 (82.74) | 91.07 (90.82) |
| 2.4 HRS (25%) | 75.74 (89.21) | 91.24 (91.24) |
| 4.8 HRS (50%) | 84.17 (91.56) | 92.95 (93.37) |
| 9.6 HRS (100%) | 90.01 (92.88) | 93.58 (93.64) |

305

| Model | SWB | CH |
|---|---|---|
| RNN-T | 6.9 | 11.9 |
| TOG-RNN-T | 6.2 | 10.5 |

306

| Model | WER% |
|---|---|
| Unadapted TOG-RNN-T | 47.5 |
| NM-LM adpt [10] | 40.4 |
| TOG adapt (P + J) | 38.6 |
| TOG adapt (P) | 37.6 |
| TOG adapt (P) + NN-LM | 36.5 |

307

| Model | WER% |
|---|---|
| Unadapted TOG-RNN-T | 3.1 |
| NM-LM adapt [10] | 2.2 |
| TOG adapt (P + J) | 1.8 |
| TOG adapt (P) | 1.9 |
| TOG adapt (P) + NN-LM | 1.7 |

308

| Model | WER% |
|---|---|
| Unadapted TOG-RNN-T | 10.4 |
| NM-LM adapt [10] | 7.5 |
| TOG adapt (P + J) | 7.3 |
| TOG adapt (P) | 7.0 |
| TOG adapt (P) + NN-LM | 6.8 |

FIG. 3

INTEGRATING TEXT INPUTS FOR TRAINING AND ADAPTING NEURAL NETWORK TRANSDUCER ASR MODELS

BACKGROUND

One or more embodiments of the present invention relates to automatic speech recognition (ASR) systems. Still more specifically, one or more embodiments of the present invention relates to adapting neural network transducer ASR models.

Traditional ASR systems have been constructed using separate acoustic model, language model, pronunciation lexicon, and decoder components. This modular approach has allowed for different parts of an ASR system to be customized independently, and in various settings using different sets of data. The acoustic model, for example, can be adapted with transcribed audio while the language model can be customized separately on a different text corpus. This kind of customization on independent data is possible because the various components are trained on different modalities: the acoustic model is trained on transcribed audio (speech and text), while the language model is trained on text data.

One advantage to the modular architecture of hybrid models, however, is that each component can be trained or adapted on separate, independent data sets. On the other hand, current all-neural E2E systems require transcribed training sets with paired speech and text transcripts. This limitation becomes profound, especially when ASR models need to be customized for new domains. With hybrid models, domain adaptation could be performed by adapting the language model on task or domain-specific text-only data and updating the lexicon to cover any new words.

Thus, one or more embodiments of the present invention address shortcoming of E2E models using a novel representation that effectively integrates text inputs into model training and adaptation.

SUMMARY

In one or more embodiments of the present invention, a method trains an automatic speech recognition system using speech data and text data. A computer device receives speech data, and generates a spectrogram based on the speech data. The computing device receives text data associated with an entire corpus of text data and/or spoken language understanding (SLU) labels, which include "intent" and/or "entity" labels, and generates a textogram based upon the text data. The computing device trains an automatic speech recognition (ASR) system using the spectrogram and the textogram.

Thus, rather than training an ASR model using only acoustic features of speech (e.g., a spectrogram) as inputs, one or more embodiments of the present invention also train a base model with "textogram" features. When the base model is thus trained with both speech and textogram features, it is then able to handle adaptation when domain adaptation data contains just text, without corresponding speech.

In one or more embodiments of the present invention, this trained ASR is a constructed base ASR model. This base ASR model construction uses transcribed speech (i.e., speech with text transcripts).

As described herein, once the base ASR model is constructed, in one or more embodiments of the present invention the base ASR model is adapted as an ASR system itself.

As described herein, once the base ASR model is constructed, in one or more embodiments of the present invention the base ASR model is adapted to a different task (e.g., spoken language understanding— SLU).

In one or more embodiments of the present invention, the text data corresponds to transcriptions of the speech data. Thus, a completely independent text data set is not used when constructing a base automatic speech recognition (ASR) model. Rather, a completely independent text data is used in the context of customization or adaptation of the base ASR model to a new domain or task.

In one or more embodiments of the present invention, intents are not utilized in the ASR model and/or the construction thereof. That is, intents are used for spoken language understanding. However, when training the ASR system/model, transcribed speech is utilized. In one or more embodiments of the present invention, such transcribed speech has paired speech and matching transcripts. With the transcribed speech, one or more embodiments of the present invention create spectrograms and textograms that train the ASR system.

In one or more embodiments of the present invention, the computing device further generates an automatic speech recognition model of the speech data based on the spectrogram and the textogram.

In one or more embodiments of the present invention, in which the speech data is first speech data, the method further comprises modifying, by the computing device, the automatic speech recognition model with a second speech data that is different from the first speech data. That is, in these embodiment(s) utilize speech based ASR adaptation of the base model to a new domain or task using transcribed speech from that new setting. The data from the new domain or corresponding to the new task is the second speech data.

In one or more embodiments of the present invention, in which the speech data is first speech data, the method further comprises modifying, by the computing device, the automatic speech recognition model with text data from a second speech data that is different from the first speech data. That is, these embodiment(s) utilize a text based ASR adaption of the base model to a new domain or task. In these embodiment(s), novel text data corresponding to the new domain or task is utilized, without a need for transcribed speech data. Thus, the present invention is able to adapt to domain data which only includes text transcripts without corresponding speech audio data.

In one or more embodiments of the present invention, in which the speech data is in a first speech language, the method further comprises modifying, by the computing device, the automatic speech recognition model with text data from a second speech language that is different from the first speech language. That is, and in these embodiment(s), the ASR base model is adapted to a different task like spoken language understanding (SLU). In one or more embodiments of the present invention, the underlying language from two different speech data is the same, since an English ASR system and is adapted to become an English SLU system.

However, adaptation of the ASR base model to an SLU model can be either as a speech based ASR adaptation or a text based adaption or hybrid combination of both where transcribed SLU speech data (paired speech and text with SLU labels if available) and text based SLU data (text with intents are available) are utilized.

Nonetheless, in one or more embodiments of the present invention an English base ASR model is adapted with Spanish data to create a Spanish ASR model. The base ASR model is an initialization for the new model. In a similar manner, an English base ASR model adapted with Spanish SLU data to create a Spanish SLU model. In both of these cases there is a language switch.

In one or more embodiments of the present invention, the computing device modifies the textogram based upon the speech data to create a modified textogram, and further trains the automatic speech recognition system using the spectrogram and the modified textogram.

In one or more embodiments of the present invention, the method(s) described herein are performed by an execution of a computer program product on a computer system.

BRIEF DESCRIPTION OF THE DRAWINGS

FIG. 3 depicts tables of results achieved in various embodiments of the present invention;

DETAILED DESCRIPTION

Figure 1:
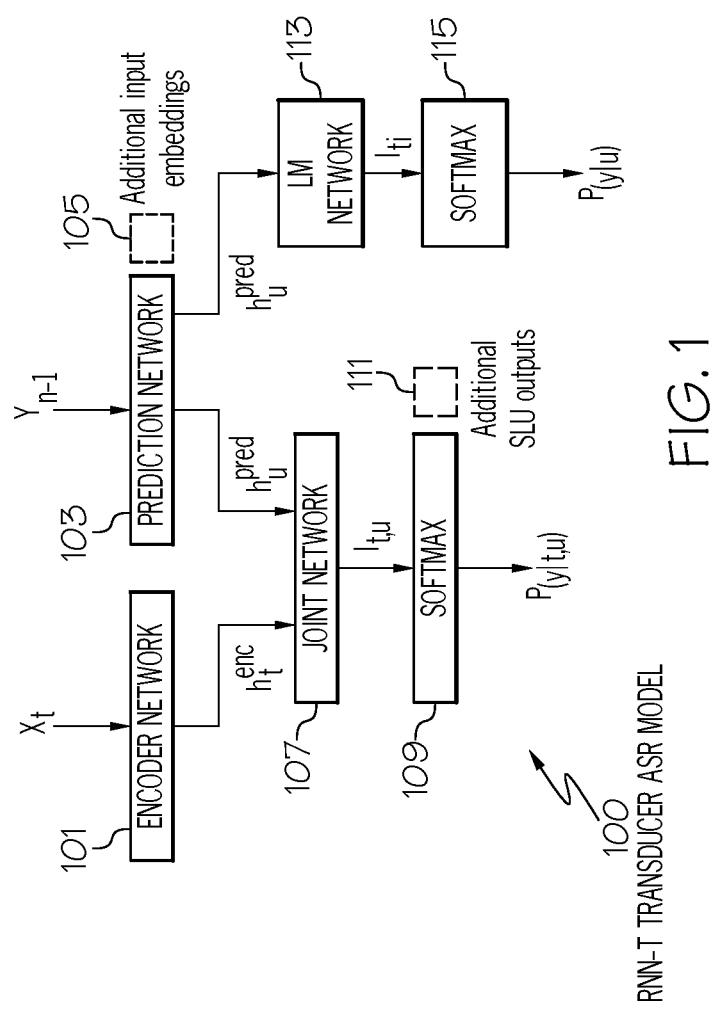
FIG. 1 depicts an exemplary recurrent neural network (RNN) transducer based automatic speech recognition (ASR) model used in one or more embodiments of the present invention.

With recent end-to-end automatic speech recognition (ASR) models, conventional modular ASR systems have been replaced by single end-to-end trained, all-neural models. A recurrent neural network (RNN) transducer model, for example, consists of three different sub-networks: a transcription network, a prediction network, and a joint network. The transcription network produces acoustic embeddings, while the prediction network resembles a language model in that it is conditioned on previous non-blank symbols produced by the model. The joint network combines the two embedding outputs to produce a posterior distribution over the output symbols.

Given this setting, one or more embodiments of the present invention adapt an ASR model on just relevant text data, without any corresponding audio. With this process of external language model customization and updating the ASR pronunciation, an ASR system is adapted to output new words and phrases, previously unseen or less frequently occurring in the ASR training data, to achieve significant ASR performance improvements.

With this kind of an end-to-end approach, since each component of the ASR system is jointly trained, prior art ASR models have limitations when it comes to customizing each component separately on different data sets. In addition, since these prior art kinds of models can only process speech inputs, an end-to-end (E2E) model cannot be adapted to a new domain using just text data. In the past, with ASR models, this could be easily done by adapting the language model component. To circumvent this issue, recent approaches first synthesize the text data using a text-to-speech system and then use the synthesized speech to adapt the network. Creating synthetic data is, however, costly and adds an additional processing step to the customization process. Another prior art approach uses a multi-task training method that trains the prediction network to also operate as a language model on text-only data. However, this approach only modifies the prediction network.

Thus, one or more embodiments of the present invention utilize a new and useful training methodology that allows ASR models not only to be trained on transcribed speech but also only on text. Once an ASR model has been trained to process both text and speech independently, the trained model can be effectively customized with text only data. After customization, the model is deployed in usual test settings to handle speech inputs as well.

Compared to other prior work, one or more embodiments of the present invention offers the following benefits:

It allows for end-to-end ASR models to be customized using just text data;

In a neural network transducer model, it allows for updates to both the prediction and the joint networks;

In addition to text based customization, the ASR model described herein is customizable using transcribed speech data. The speech collection can be either synthetic or real speech or both; and This approach presented by one or more embodiments of the present invention is not limited to customization of just the ASR model, but also relates to customization of an existing ASR model into a model for a different task, such as spoken language understanding with just text data.

To allow the ASR model to be trained on both text and speech, one or more embodiments of the present invention utilize a novel representation of text, called a textogram.

Similar to the time-frequency spectrogram representation of speech, a textogram is a 2 dimensional representation of text in terms of various linguistic symbols. While the x-axis represents time, the y-axis represents the identity of various active linguistic symbols. As an example, if the ASR model being trained was a graphemic system, the y-axis will correspond to the inventory of graphemic symbols used as output symbols of the model. The time x-axis signifies the duration each linguistic symbol is active in the sentence of text being represented. A textogram representation for the sentence "hello world", would hence have the row corresponding to "h" active for a certain duration, followed by the row "e" being active, then the "l" row and so forth.

Figure 2:
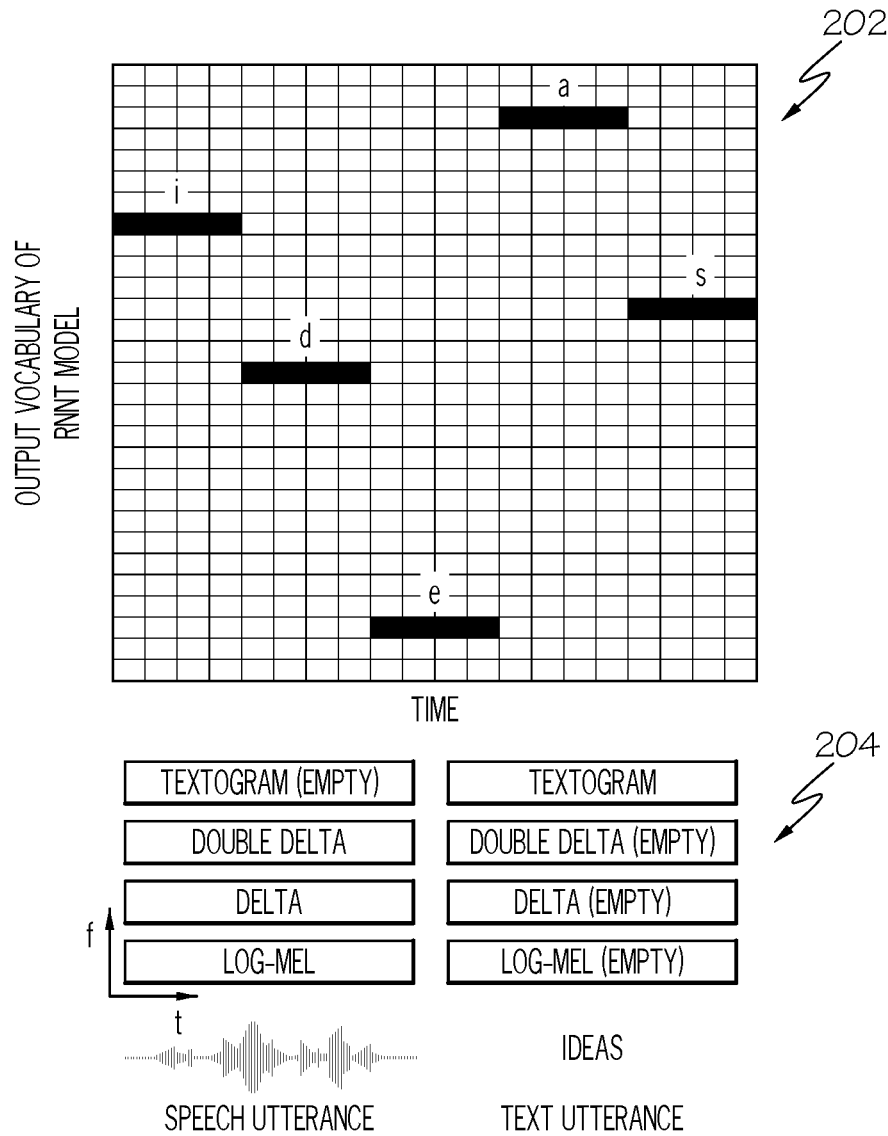
FIG. 2 illustrates an exemplary textogram representation of linguistic symbols as used in one or more embodiments of the present invention.

To allow the model to learn robustly from the textogram representations, various variabilities are added to the representation in various embodiments of the present invention. Such variabilities include, but are not limited to:

Label masking: To allow the model to learn useful n-gram sequences instead of blindly memorizing sequences, active entries of the textogram representation are randomly dropped. The rate of label masking is a parameter that are empirically selected;

Label confusions: The acoustic confusion among various speech sounds are introduced into the textogram by substituting various labels with their confusable sounds e.g. 'p' and 'b';

Variable label duration: The length of each linguistic unit are varied to model real durations in the speech signal. In FIG. 2, four frames are used per symbol, although they are shorter longer, and/or varying in one or more embodiments of the present invention;

Modeling pronunciations: The input textogram may include different "sounds-like" sequences for a given target output. For example, the target "Miami" if unseen in the acoustic training data, may be associated with textogram sequences "Miami," "my Amy," or "mee Amy," etc. Alternatively, the input textogram may allow for phonetic rather than graphemic inputs; and Multiple linguistic symbol sets: The symbol set used with textograms are different from the output symbol set for the ASR model. For example, phonetic targets are used at the RNN-T's output while graphemes are used for textograms.

In one or more embodiments of the present invention, a fixed label duration is used for various text symbols along with label masking, to construct textogram features.

To allow the model to be able to process both text and speech, an ASR model is trained on both spectrogram and textogram representations. Spectrogram representations correspond to log-mel features derived from the transcribed speech training data. Textogram representations on the other hand are created from text data available either as speech transcripts of the training data or as other sets of text only data. If a training sample is a speech utterance, log-mel features are extracted for the utterance. An empty text-o-gram is further created for the speech utterance and appended to the spectrogram representation. The final feature representation for this utterance is a concatenation of the spectrogram and textogram representations. On the other hand, if the training sample is a text utterance, an empty logmel representation is concatenated with a textogram representation.

Once an ASR model has been trained, in one or more embodiments it is further customized in various settings: text only, speech only, text and speech. During test time the customized model is able to process speech utterances.

As described above and herein, a major hurdle in building end-to-end spoken language understanding system that can process speech inputs directly is the limited amount of available speech training data with spoken language understanding (SLU) labels. To circumvent this issue, past approaches have synthesized speech using text-to-speech (TTS) systems or shared network layers with text based classifiers. With the TTS approach, while additional processing resources have to be assembled to process and synthesize the text, with the shared classifier approach, existing models often have to be reconfigured and retrained to accommodate changes in network architecture and inputs. Thus, one or more embodiments of the present invention provide a new and useful method that has a single end-to-end (E2E) model that can process both speech and text modalities, such that SLU models are effectively trained and adapted on both speech and text data.

With reference now to FIG. 1, one or more embodiments of the present invention utilize E2E SLU systems that use RNN Transducer (RNN-T) models, such as the RNN-T transducer ASR model 100 depicted in FIG. 1. RNN-T models consist of three different sub-networks: an encoder network 101, a prediction network 103, and a joint network 107. The encoder or transcription network produces acoustic embeddings, while the prediction network resembles a language model in that it is conditioned on previous non-blank symbols produced by the model. The joint network combines the two embedding outputs to produce a posterior distribution over the output symbols. This architecture elegantly replaces a conventional ASR system composed of separate acoustic model, language model, pronunciation lexicon, and decoder components, using a single end-to-end trained, streamable, all-neural model that has been widely adopted for speech recognition. The output $l_{t,u}$ from the joint network 107 is sent to a softmax (function) 109, which uses multinomial logistic regression or a similar algorithm normalize the output of the joint network 107 network to a probability distribution over predicted output classes, shown as P(y|t,u).

Starting from a pre-trained RNN-T ASR model, one or more embodiments of the present invention construct an SLU model by adapting the ASR model into a domain-specific SLU model. The new SLU labels are integrated by modifying the joint network and the embedding layer of the prediction network to include additional symbols as shown in FIG. 1, including additional input embeddings 105 and additional SLU outputs 111. The new network parameters are randomly initialized, while the remaining parts are initialized from the pre-trained ASR network. The initial SLU model is then further trained using paired speech and text data with transcripts and SLU labels. In this work one or more embodiments of the present invention develop a novel technique of training SLU models not only with speech paired with transcripts and SLU labels, but also on text-only data annotated with SLU labels. In contrast to prior work, the text-only data is used directly without having to synthesize it using a TTS system.

In one or more embodiments of the present invention, parts of the RNN-T transducer ASR model 100 are directly updated, and thus do not require changes to decoding. For example, and in such embodiment(s), a text-to-speech (TTS) model is used to synthesize audio from text, and then the paired synthetic speech and text are used to adapt the prediction network 103. As such, the predicted output ($H_u^{pred}$) from the prediction network 103 goes to a language model (LM) network 113, which sends its output $l_u$ to a softmax (function) 115, which outputs a probability distribution over predicted output classes, shown as P(y|u).

To review FIG. 1, then, $x_t$ is sound and text; $y_{u-1}$ is a text sequence; encoder network 101 is similar in function to an acoustic model; prediction network 103 is similar in function to a language model; joint network 107 is similar in function to a shared model that includes both acoustic model and language model features; and LM network 113 and softmax (function) 115 combine to create a language model.

Textograms

In order to train RNN-T based SLU models with text-only data, one or more embodiments of the present invention utilize a novel feature representation for text and training framework. First, an ASR model is pretrained using both standard speech features and the novel text features, called textograms. Subsequently, the ASR model is adapted as an SLU model.

In one or more embodiments, the ASR model is adapted for other types of speech recognition systems, besides SLU. Thus, if a new client has specific domain text data, the model is adapted to that data for speech recognition purpose.

Textograms are constructed to be frame-level representations of text, similar to posteriograms, which are soft-max posterior outputs of a trained neural network acoustic model. However, because they are constructed from ground truth text, textograms use 1-hot encodings. For example, given an input text "ideas", as shown in textogram 202 in FIG. 1, graphemic textogram features are constructed by first splitting the word into its constituent graphemes, "i", "d", "e", "a", "s". Each symbol is then allowed to span a fixed time duration, four frames in this case, to create a 2-dimensional representation as shown in FIG. 2. Once constructed in this fashion, these representations are used along with log-mel speech features to train RNN-T models. Because textograms have the same frame level construction as speech features, they are integrated into an existing RNN training framework by stacking them along with speech features: training samples for speech features have the textogram features set to 0.0, and conversely training samples for text features have the speech features set to 0.0.

Training RNN-T Models

In one or more embodiments of the present invention, an RNN-T models the conditional distribution p(y|x) of an output sequence y=(y1, . . . , yU) ∈ Y* of length U given an input sequence x=($x_1$, . . . , xT) ∈ X* of length T. In an ASR setting, while the elements of x are continuous multidimensional speech features, y is discrete and corresponds to an output symbol set, like the grapheme set of the language being modelled by the network. To facilitate the alignment of the two sequences, which in general have different lengths, the output alphabet is augmented with an additional BLANK symbol that consumes one feature vector from the input sequence, x, and produces a null output. p(y|x) is computed by marginalizing over all possible alignments between x and y.

The probability of a particular alignment is computed in terms of embeddings, $h^{enc}$, of the input sequence computed by the encoder network and embeddings, $h^{pred}$, of the output sequence computed by a prediction network. The joint network combines these two embeddings to produce a posterior distribution over the output symbols. Training is based on an efficient forward-backward algorithm, with T×U complexity for both loss and gradient computation, that minimizes −log p(y|x), the negative log-likelihood loss and uses speech data paired with corresponding text transcripts.

Representing text as textograms allows us to extend the RNN-T training framework. In addition to training the network using samples comprising paired speech and text data, ($x^{sp}$,y), where the speech is represented by an acoustic feature sequence $x^{sp}$ and the text is represented by a symbol sequence y, one or more embodiments of the present invention also train the network using samples comprising paired text representations ($x^{txt}$,y), where $x^{txt}$ is the textogram representation of the text and y is the symbol sequence.

For the (speech, text) samples in the training set, the present inventors extract logmel features augmented with Δ and $Δ^2$ features and set the input dimensions corresponding to the textogram features to 0.0, as shown in FIG. 2. To improve the robustness of the speech training, sequence noise injection and SpecAugment are applied to the speech features. Sequence noise injection adds attenuated features from a randomly selected training utterance to the features of the current utterance with some probability. SpecAugment, on the other hand, masks the spectrum of a training utterance with a random number of blocks of random size in both time and frequency.

For the (text, text) samples, one or more embodiments of the present invention compute textogram features for each transcript and set the input dimensions corresponding to the acoustic features to 0.0, as shown in FIG. 2. To prevent the (text, text) task from being completely trivial, one or more embodiments of the present invention apply label masking to the textogram features.

By integrating text inputs into the training pipeline, the RNN-T model's transcription network is now trained as a single encoder for two modalities: speech and text. With this joint training, the transcription network produces similar embeddings for both speech and text that can be further used along with a prediction and joint network that are shared by both modalities.

Adapting RNN-T Models

Once an RNN-T model has been trained on both speech and text, it is adapted to a new domain using only text data. Prior to the adaptation process, the text-only adaptation data is converted into textogram features. The RNN-T model is then adapted using these features. The parameters of the transcription network are kept constant during the adaptation process, while the parameters of the prediction and joint networks may be updated. This ensures that the model is still acoustically robust while being able to effectively process data from the new domain.

EXPERIMENTS AND RESULTS

The RNN-T Base Model with Textogram Features

The RNN-T models used by the present inventors are trained on a collection of US English telephony. Each RNN-T model has several sub-networks as illustrated in FIG. 1. In one or more embodiments of the present invention, the transcription network contains 6 bidirectional LSTM layers with 640 cells per layer per direction. The prediction network is a single unidirectional LSTM layer with only 1024 cells. The joint network projects the 1280-dimensional stacked encoder vectors from the last layer of the transcription net and the 1024-dimensional prediction net embedding each to 256 dimensions, combines them multiplicatively, and applies a hyperbolic tangent. Finally, the output is projected to 42 logits, corresponding to 41 characters plus BLANK, followed by a softmax function. The RNN-T based ASR models are trained using 40-dimensional, global mean and variance normalized log-Mel filterbank features, extracted every 10 ms. These features are augmented with Δ and $Δ^2$ coefficients, every two consecutive frames are stacked, and every second frame is skipped, resulting in 240-dimensional vectors every 20 ms. Likewise, every two frames of the textogram representations are stacked, and every second frame is skipped, resulting in 84 dimensional vectors every 20 ms. Thus, the transcription network takes a 324-dimensional input.

The speech data was augmented using speed and tempo perturbation with values in {0.9, 1.1} for both speed and tempo separately, resulting in 4 additional speech training data replicas. For sequence noise injection, the present inventors added, with probability 0.8, to the spectrum of each training utterance the spectrum of one random utterance of similar length scaled by a factor of 0.4.

Textogram representations of the text data are generated using the same grapheme set that is modelled at the outputs of the RNN-T and a fixed duration of four frames per symbol. Label masking at a rate of 25% is applied to the textograms to prevent the model from simply reproducing the input.

The RNN-T models were trained on multiple graphical processing units (GPUs for 20 epochs using an optimizer. The maximum learning rate was set to 2e-4 and the cycle policy consisted in a linear warmup phase from 2e-5 to 2e-4 over the first 6 epochs followed by a linear annealing phase to 0 for the remaining 14 epochs. The present inventors used an effective batch size of 128 utterances. Batches are constructed from feature sequences of similar lengths without regard to whether the features are mel spectrograms or textograms, so generally each batch contained both types of training sample.

The present inventors trained two RNN-T models in a first set of experiments: an RNN-T model on all the available speech data and a textogram based model trained on both speech and text. Both the models had the same architecture, except that the first layer in the transcription network had a larger input in the model trained on speech and text, and both models were constructed using the same training procedure described above. In table 305 shown in FIG. 3 are results on the commonly used switchboard test sets, which were processed using segmentations and scored using scoring setups for measuring word error rate (WER). An RNN-T model trained with the proposed textogram (TOG) method, TOG-RNN-T, significantly improved over a competitive baseline model trained on just speech data. The relative WER reduction of 10% and 13% on segmentations using the model jointly trained with speech and text inputs was due to a regularization effect caused by training on two modalities using twice as much data. The twofold increase in training data is because the transcripts used corresponded to the speech data as additional text inputs to train the model. As such, using textograms is another approach to data augmentation when training RNN-T models for ASR.

RNN-T Adaptation to Various Domains

In a next set of experiments, the present inventors adapted the general purpose textogram based model to various new domains and settings. To measure the usefulness of the proposed technique presented herein, the inventors implemented the text-only adaptation technique proposed herein and compared results. As shown in FIG. 1, to adapt the prediction network on text-only input, a temporary learning machine (LM) layer (LM network 113) is first attached and trained along with a softmax output layer (softmax 115) on training data transcripts using a standard cross-entropy loss. Once the LM layer has been trained, it is kept fixed while the prediction network is further adapted to novel text data from the new domain. This training uses two auxiliary losses for better regularization: a relative entropy divergence loss that controls how similar the adapted model's output distribution is to the original unadapted model's distribution and a weight regularization loss that prevents the adapted model's weights from drifting away from the base model. Compared to this NN-LM based technique, the presently proposed textogram based method performs adaptation by optimizing the RNN-T loss rather than cross-entropy. The present inventors conducted adaptation experiments on three diverse datasets.

Adaptation to the spoken language dataset: A spoken language dataset is a dataset for spoken language understanding. The audio data was collected in challenging acoustic conditions found in a typical home or office environment using far-field and close speaking microphones. The training partition of the dataset has about 11K text sentences. The present inventors adapted a model using text only data from this dataset and tested it on the corpus's speech test set, which corresponded to 10 hours of speech. The test data was also downsampled to 8 kHz for one or more iterations of the presently described experimentation. Given that the spoken language dataset was collected for developing an in-home personal robot assistant, this domain is quite different from the original base model training data. Table 306 in FIG. 3 shows the performance of various adaptation techniques on this dataset. The unadapted model's WER is quite high since the spoken language dataset is substantially different both acoustically and linguistically. The neural LM based adaptation technique reduced the WER by about 15% relative. The present inventors next adapted the RNN-T model in three different ways using the method presented herein: (1) in TOG adapt (P+J) the present inventors adapted both the prediction and joint networks, (2) in TOG adapt (P) the present inventors adapted only the prediction network, and (3) in TOG adapt (P)+NN-LM the present inventors combined textogram adaptation with the NN-LM technique. Adapting the RNN-T base model with textogram based features significantly improved the WER reduction. The present inventors observed more gains by adapting just the prediction network than adapting both the prediction and the joint networks. Combining the NN-LM adaptation method provides further regularization to the textogram based adaptation and provides the best relative WER reduction of 23%.

Adaptation to the public transportation dataset: In a second set of experiments, the present inventors used a public transportation dataset that included 893 test utterances. The test utterances comprised about 1.5 hours of audio from 55 speakers. The data was originally collected at 16 kHz, but is downsampled to 8 kHz to match the telephony base model. The present inventors repeated the same set of adaptation experiments on this dataset as well, which results are shown in table 307 in FIG. 3. Although the WER of the unadapted model is much lower compared to results on the spoken language dataset described above, the model still benefits from adaptation. Similar to previous results, the NN-LM adaptation technique improves WER reduction by 30% relative. Although the proposed textogram adaptation of just the prediction network improves on top of these gains to 40% relative WER reduction, combining with the NN-LM technique improves the performance further by 45% relative.

Adaptation to a service dataset: In a final set of experiments, the present inventors adapted the baseline RNN-T model to a service data corpus. This dataset is a public domain corpus with spoken dialogs that simulate simple service interactions between users and agents. There are 1,446 human-human conversations between 59 unique speakers. The present inventors adapted the model on 15K text transcripts from the training partition before testing the adapted model on a 1.5 hour speech test set.

Similar to the previous two customization experiments, significant performance gains using the proposed adaptation techniques are achieved, as shown in table 308 in FIG. 3. Consistent gains are observed by adapting just the prediction network using the text-only transcripts. Compared to the NN-LM method, the textogram based method is able to better adapt this sub-network. This is because of the holistic nature of the adaptation process where the prediction network is not adapted independently using a separate loss, but is adapted along with embeddings from the transcription network using the original RNN-T training loss, via the joint network. In this case as well, the present inventors observed up to 34% relative WER reduction after adaptation compared to the unadapted model. Combining the NN-LM training loss with the RNN-T training loss gives the best improvements, suggesting that the prediction network can benefit further when good regularization is used.

Constructing RNN-T Models for SLU

Pre-Trained ASR Models

An RNN-T models the conditional distribution $p(y|x)$ of an output sequence $y=(y_i, \ldots, y_U) \in Y^*$ of length U given an input sequence $x=(x_i, \ldots, x_T) \in X^*$ of length T. In ASR, x is a sequence of continuous multidimensional speech features and y is a sequence of discrete output symbols, like the grapheme set of the language being modelled by the network. The distribution $p(y|x)$ is further expressed as a sum over all possible alignment probabilities between the input and output sequences. To create alignments between the unequal length input-output sequences, it is necessary to introduce an additional BLANK symbol that consumes one element of the input sequence and generates a null output. The probability of a particular alignment is computed in terms of embeddings $h^{enc}$ of the input sequence (including the additional input embeddings 105, e.g., information from the table 204 shown in FIG. 2) that are used by the prediction network 103) computed by the encoder network and embeddings $h^{pred}$ of the output sequence computed by the prediction network. The joint network combines these embeddings to produce a posterior distribution over the output symbols, which includes the additional SLU outputs 111 (which are output from the joint network 107 by processing the additional input embeddings 105). Within this framework, RNN-T models are trained to minimize $-\log p(y|x)$, the negative log-likelihood loss, via an efficient forward-backward algorithm with T×U complexity for both loss and gradient computation.

The model is now trained with both speech inputs, represented using speech features, and text inputs, represented using textograms.

This effectively doubles the number of training examples, so from one perspective the use of textograms in training is a form of data augmentation. For samples represented by speech features, one or more embodiments of the present invention extract log-mel features, along with delta and double-delta features. The dimensions in the input corresponding to textogram features are set to 0.0, as shown in FIG. 2. With sequence noise injection, attenuated features from a randomly selected training utterance are added with a given probability to the features of the current training utterance. Speech features that are warped in the time direction, on the other hand, masks the spectrum of a training utterance with a random number of blocks of random size in both time and frequency. For the text data, one or more embodiments of the present invention extract textogram features corresponding to each text transcript and apply label masking with a mask probability of 25%. As shown in FIG. 2, the dimensions corresponding to speech features are set to 0.0 for training samples that use textogram features. By integrating text inputs into the training pipeline, the RNN-T model's transcription network is now trained as a single encoder for two modalities: speech and text. With this joint training, the transcription network produces similar embeddings for both speech and text that are further used along with a prediction and joint network that are shared by both modalities.

Adapting RNN-T Models for SLU

Once an RNN-T ASR model has been trained on both speech and text, one or more embodiments of the present invention adapt this pre-trained base model into an SLU model with both speech and text data, following a training procedure similar to that described above for ASR. The SLU training is done as follows:

Creating an initial SLU model: In the ASR pre-training step, the targets are graphemic/phonetic tokens only, but for SLU adaptation the targets also include semantic labels. Starting with an ASR model, the new SLU labels are integrated by modifying the joint network and the embedding layer of the prediction network to include additional output symbols. The new network parameters are randomly initialized, while the remaining parts are initialized from the pre-trained network.

Training on text-only SLU data: Prior to the adaptation process, the text-only SLU data is converted into textogram based features. The textogram does not represent the SLU targets, but only the speech transcripts. The RNN-T model is then adapted using these features to predict various SLU labels. While adapting an RNN-T with text-only data, one or more embodiments of the present invention keep the transcription network fixed and adapt the prediction and joint networks. This ensures that the model is still acoustically robust while being able to effectively process data from the new domain.

Training on speech and text SLU data: When both speech and text data are available to train an SLU model, the RNN-T is adapted using both types of input, much in the same way that the model is pretrained using both types of input. However, when a speech sample is presented during adaptation on mixed data, the entire network is updated, but when a text sample is presented, only the prediction and joint networks are updated. This allows the model both to adapt to new acoustic conditions and to learn to process SLU targets.

Training the Base ASR Model

The RNN-T models used in experiments conducted by utilizing one or more embodiments of the present invention were trained using various telephone speech corpora. Each RNN-T model has three sub-networks as illustrated in FIG. 1. The encoder network 101 (also known as a transcription network) contains 6 bidirectional LSTM layers with 640 cells per layer per direction. The prediction network 103) is a single unidirectional LSTM layer with only 1024 cells. The joint network 107 projects the 1280-dimensional stacked encoder vectors from the last layer of the transcription net and the 1024-dimensional prediction net embedding each to 256 dimensions, combines them multiplicatively, and applies a hyperbolic tangent. Finally, the output is projected to 42 logits, corresponding to 41 characters plus BLANK, followed by softmax 109. The RNN-T SLU models are trained using 40-dimensional, global mean and variance normalized log-Mel filterbank features, extracted every 10 ms. These features are augmented with $\Delta$ and $\Delta\Delta$ coefficients, every two consecutive frames are stacked, and every second frame is skipped, resulting in 240-dimensional vectors every 20 ms. These speech features are finally appended with empty textogram features to create 324 dimensional vectors.

In addition to the speech data, one or more embodiments of the present invention use all the available text transcripts as training data as well. These transcripts are first converted into textogram features before they are shuffled along with speech utterances to train an RNN-T model on both modalities. Each text input is split using the same grapheme set modelled at the outputs of the RNN-T. One or more embodiments of the present invention use a 4 frame duration for each symbol and randomly mask out 25% of the inputs to prevent the model from overfitting on the text inputs. Similar to the speech utterances, textogram features corresponding to text utterances are finally appended with empty speech features. The RNN-T models are trained for 20 epochs using an optimizer. Once trained, one or more embodiments of the present invention measure the effectiveness of this base ASR model on the commonly used speech test sets. The model has a very competitive word error rate (WER) between 6.2% and 10.5% on these test sets.

Development of SLU Models

In the following experiments, one or more embodiments of the present invention adapt the pre-trained ASR model to build SLU models in various settings. One or more embodiments of the present invention use three SLU datasets for experiments.

Dialog action recognition on the service dataset. In a first set of experiments, one or more embodiments of the present invention adapt the baseline ASR model to the service corpus. The dataset is a public domain corpus with spoken dialogs that simulate simple consumer interactions between users and agents. There are 1,446 human-human conversations between 59 unique speakers. One or more embodiments of the present invention focus on the dialog action prediction task in this work. In this task the goal is to predict one or more of 16 possible dialog actions for each utterance. The training set contains 1174 conversations (10 hours of audio, 15K text transcripts) and the test set has 199 conversations (1.8 hours of audio). As described earlier, once an initial SLU model is constructed, the model is adapted with domain specific SLU data.

Table 301 shown in FIG. 3 shows the various experiments and results on this dataset. In a first experiment, one or more embodiments of the present invention train the SLU model with text-only data annotated with SLU labels. The text data is converted into textogram features and then used to adapt the prediction and joint network of the SLU RNN-T. This text-only adaptation produces a model that performs at 45.05 F1 score. Next, using only speech data in varying quantities, one or more embodiments of the present invention adapt the RNN-T model (including the transcription network component) to show that the performance improves from 47.88 F1 with 10% of speech data to 53.57 F1 with all of the available speech training data. Finally, one or more embodiments of the present invention use varying quantities of speech data along with all the text data to adapt the RNN-T model, obtaining models that achieve F1 scores of 53.84 or better.

One or more embodiments of the present invention can make a number of observations based on these results. First, with no speech data at all, the model is able to process the SLU test set at nearly 82% of full speech performance (53.57 F1 score). These results demonstrate the usefulness of the presently-presented method for constructing SLU models with just text data. Second, only a small amount of speech data is required to train a strong SLU model if all of the text data is used. With 10% of speech data, adding text data improves model performance to 53.84 F1, which is at 98% of the performance with full speech (53.57 F1 score). This result shows that while the text data provides information to learn the SLU targets (45.05 F1), acoustic robustness to this new domain comes from the speech training (53.84 F1). Finally, as the amount of speech data is increased, one or more embodiments of the present invention see very modest improvements as the model has already learnt to process SLU targets from the text inputs and adapted to acoustic conditions of the new domain.

Intent Recognition on Call Center data. The second data set is based on an internal data collection consisting of call center recordings of open-ended first utterances by customers describing the reasons for their calls. The 8 kHz telephony speech data was manually transcribed and labeled with one of 29 intent classes. The corpus contains real, spontaneous utterances from customers, not crowdsourced scripted or role-played data, and it includes a wide variety of ways that customers naturally described their intents. The training data consists of 19.5 hours (22K utterances) of speech that was first divided into a training set of 17.5 hours and a held-out set of 2 hours. A separate data set containing 5592 sentences (5 h, 40K words) was used as the final test set [8]. This task contains only intent labels and does not have any labeled semantic entities.

Table 302 shown in FIG. 3 shows the results of training an SLU model for intent recognition on this dataset. With just text-only training, the model achieves an intent recognition accuracy of 76.97%, which is about 86% of full performance with speech SLU data (89.06% intent recognition), similar to previous experiments on the service dataset described above. With an additional 10% of speech data, the model performance rises to 88.34%, which is 99% of full performance with speech. As the amount of speech data increases, although one or more embodiments of the present invention observe slight improvements, the model is clearly able to learn about the SLU domain and novel conditions already with very limited amounts of transcribed data and large amounts of text-only SLU data. These results clearly show the benefit of the present approach in many practical SLU settings where there are large amounts of text-only training data and limited or almost no speech training data. With the present method, an SLU system is effectively bootstrapped with just the text-only data and then improved to close to full performance with very limited amounts of speech data. This helps to significantly reduce the cost overhead in building speech based E2E SLU systems in terms of data collection and additional resources like TTS systems.

C. Entity and Intent Recognition on recorded data. In a set of experiments one or more embodiments of the present invention use the recorded data training and test sets: 4976 training utterances from Class A (context independent) training data in 893 test utterances from the recorded data. The test utterances comprise about 1.5 hours of audio from 55 speakers. The data was originally collected at 16 kHz, but is downsampled to 8 kHz to match the base recorded model. The recorded data includes both entity (slot filling) and intent recognition. Similar to previous experiments, one or more embodiments of the present invention first conduct intent recognition experiments on the recorded data corpus.

Table 303 in FIG. 3 shows the intent recognition results of various SLU systems trained on the recorded data corpus. Similar to previous results, the text-only model is able to perform relatively well at 93% of the full speech performance (90.59% vs. 96.42% intent recognition accuracy). Although adding 10% of speech data improves performance, one or more embodiments of the present invention only achieve almost 99% of full performance with 50% of additional speech data. One or more embodiments of the present invention hypothesize that this is because the retest set is quite varied in terms of speaker coverage compared to the other test sets, and hence requires more domain specific speech data. Regardless, the model is able to learn about the SLU domain and SLU targets with just the available text data.

In a next set of experiments (see Table 304 in FIG. 3), one or more embodiments of the present invention measure the effectiveness of the present approach on entity recognition using the recorded data corpus. Similar to previous intent recognition experiments, in this case as well, the SLU model is able to learn on text-only data and a mix of text and speech data. An SLU model trained on text-only data with SLU labels achieves an F1 score of 85.95%. This is 95% of full performance with speech data at 90.01 F1 score. Adding 10% of speech data improves this to 91.07 F1 score, which even outperforms a model trained on all the speech data. Given this result, one or more embodiments of the present invention add speed and tempo data augmentation, resulting in additional training data replicas. While the speech-only results improve significantly, one or more embodiments of the present invention still clearly see the additional benefit from adding text-only data. As mentioned earlier, the multimodal speech and text training allows the model to learn both SLU targets and also novel acoustic variabilities from the dataset. While the information from the text-only data is very useful for transferring SLU knowledge, it is also necessary for the model to be acoustically robust. For this, only a very small amount of speech data is necessary within the presently-presented training framework.

For one or more of the experiments described herein, the RNN-T models are trained using multiple graphical processing units (GPUs) for multiple time epochs. Similar to the base ASR model training, the maximum learning rate is set to 2e-4 and a policy with a linear warmup phase from 2e-5 to 2e-4 over the first 6 epochs followed by a linear annealing phase to 0 for the remaining 14 epochs is employed. One or more embodiments of the present invention use an effective batch size of 128 utterances. Batches are constructed from feature sequences of similar lengths without regard to whether the features are mel spectrograms or textograms.

As described herein, one or more embodiments of the present invention demonstrate the efficacy of a novel method that alleviates the need for annotated speech training data to build SLU systems. Using a novel frame-level text representation, one or more embodiments of the present invention first pre-train an ASR model that can process both speech and text data. With text-only SLU data and very limited amounts of speech, these models are further adapted to various SLU tasks. These SLU models perform at comparable levels as similar systems built on fully annotated speech SLU datasets. With text only training, one or more embodiments of the present invention achieve up to 90% of the performance possible with full speech training. With just an additional 10% of speech data, these models significantly improve further to 97% of full performance.

Figure 4:
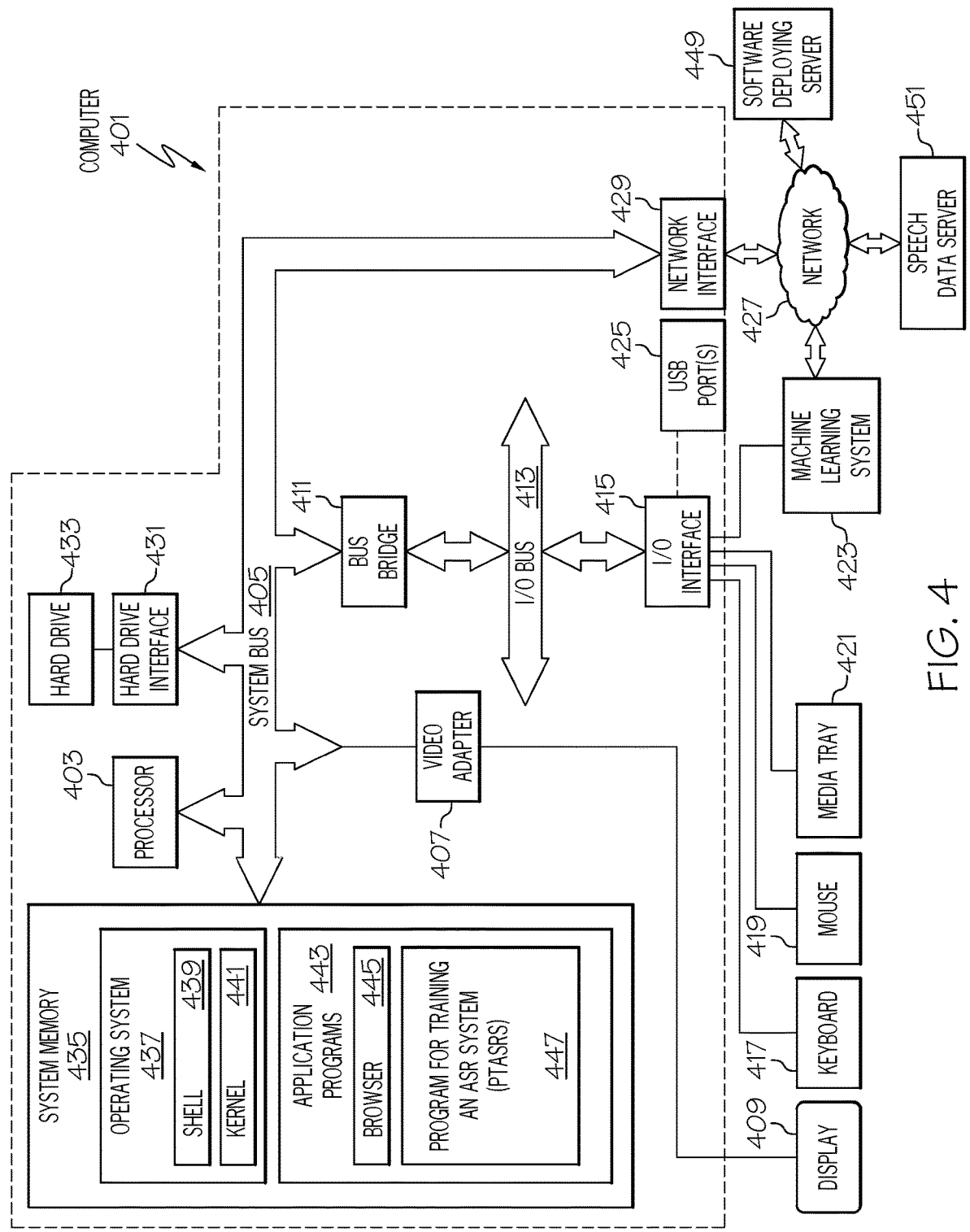
FIG. 4 depicts an exemplary system and network in which the present disclosure can be implemented.

With reference now to FIG. 4, there is depicted a block diagram of an exemplary system and network that is utilized by and/or in the implementation of one or more embodiments of the present invention. Note that some or all of the exemplary architecture, including both depicted hardware and software, shown for and within computer 401 are utilized by machine learning system 423 and/or software deploying server 449 and/or speech data server 451 shown in FIG. 4, and/or other processing devices depicted in other figures associated with one or more embodiments of the present invention.

Exemplary computer 401 includes a processor 403 that is coupled to a system bus 405. Processor 403 may utilize one or more processors, each of which has one or more processor cores. A video adapter 407, which drives/supports a display 409, is also coupled to system bus 405. System bus 405 is coupled via a bus bridge 411 to an input/output (I/O) bus 413. An I/O interface 415 is coupled to I/O bus 413 I/O interface 415 affords communication with various I/O devices, including a keyboard 417, a mouse 419, a media tray 421 (which may include storage devices such as CD-ROM drives, multi-media interfaces, etc.), and external USB port(s) 425. While the format of the ports connected to I/O interface 415 may be any known to those skilled in the art of computer architecture, in one embodiment some or all of these ports are universal serial bus (USB) ports.

As depicted, computer 401 is able to communicate with a network 427 using a network interface 429. Network interface 429 is a hardware network interface, such as a network interface card (NIC), etc. Network 427 may be an external network such as the Internet, or an internal network such as an Ethernet or a virtual private network (VPN).

A hard drive interface 431 is also coupled to system bus 405. Hard drive interface 431 interfaces with a hard drive 433. In one embodiment, hard drive 433 populates a system memory 435 which is also coupled to system bus 405. System memory is defined as a lowest level of volatile memory in computer 401. This volatile memory includes additional higher levels of volatile memory (not shown), including, but not limited to, cache memory, registers and buffers. Data that populates system memory 435 includes computer 401's operating system (OS) 437 and application programs 443.

OS 437 includes a shell 439, for providing transparent user access to resources such as application programs 443. Generally, shell 439 is a program that provides an interpreter and an interface between the user and the operating system. More specifically, shell 439 executes commands that are entered into a command line user interface or from a file. Thus, shell 439, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 441) for processing. Note that while shell 439 is a text-based, line-oriented user interface, one or more embodiments of the present invention will equally well support other user interface modes, such as graphical, voice, gestural, etc.

As depicted, OS 437 also includes kernel 441, which includes lower levels of functionality for OS 437, including providing essential services required by other parts of OS 437 and application programs 443, including memory management, process and task management, disk management, and mouse and keyboard management.

Application programs 443 include a renderer, shown in exemplary manner as a browser 445. Browser 445 includes program modules and instructions enabling a world wide web (WWW) client (i.e., computer 401) to send and receive network messages to the Internet using hypertext transfer protocol (HTTP) messaging, thus enabling communication with software deploying server 449, untrusted remote server 451 and other computer systems.

Application programs 443 in computer 401's system memory also include a Program for Training an ASR System (PTASRS) 447. PTASRS 447 includes code for implementing the processes described below, including those described in FIGS. 3-7. In one or more embodiments of the present invention, computer 401 is able to download PTASRS 447 from software deploying server 449, including in an on-demand basis, wherein the code in PTASRS 447 is not downloaded until needed for execution. Note further that, in one or more embodiments of the present invention, software deploying server 449 performs all of the functions associated with the present invention (including execution of PTASRS 447), thus freeing computer 401 from having to use its own internal computing resources to execute PTASRS 447.

The speech data server 451 is a server that provides speech data (e.g., $x_t$ and/or yu-1 shown in FIG. 1) to the RNN-T transducer ASR model 100 shown in FIG. 1.

Note that the hardware elements depicted in computer 401 are not intended to be exhaustive, but rather are representative to highlight essential components required by one or more embodiments of the present invention. For instance, computer 401 may include alternate memory storage devices such as magnetic cassettes, digital versatile disks (DVDs), Bernoulli cartridges, and the like. These and other variations are intended to be within the spirit and scope of the present invention.

In one or more embodiments of the present invention, and as described herein, artificial intelligence in the form of a recurrent neural network (e.g., the RNN-T transducer used to generate the RNN-T transducer ASR model 100 shown in FIG. 1) is used to understand spoken language.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons in certain electronic neural networks are never technically "inhibitory", but are only "excitatory" to varying degrees. In other electronic neural networks, however, electronic neurons are capable of inhibitory signals, which reduce the ability of a follow-on neuron to produce a positive output.

Figure 5:
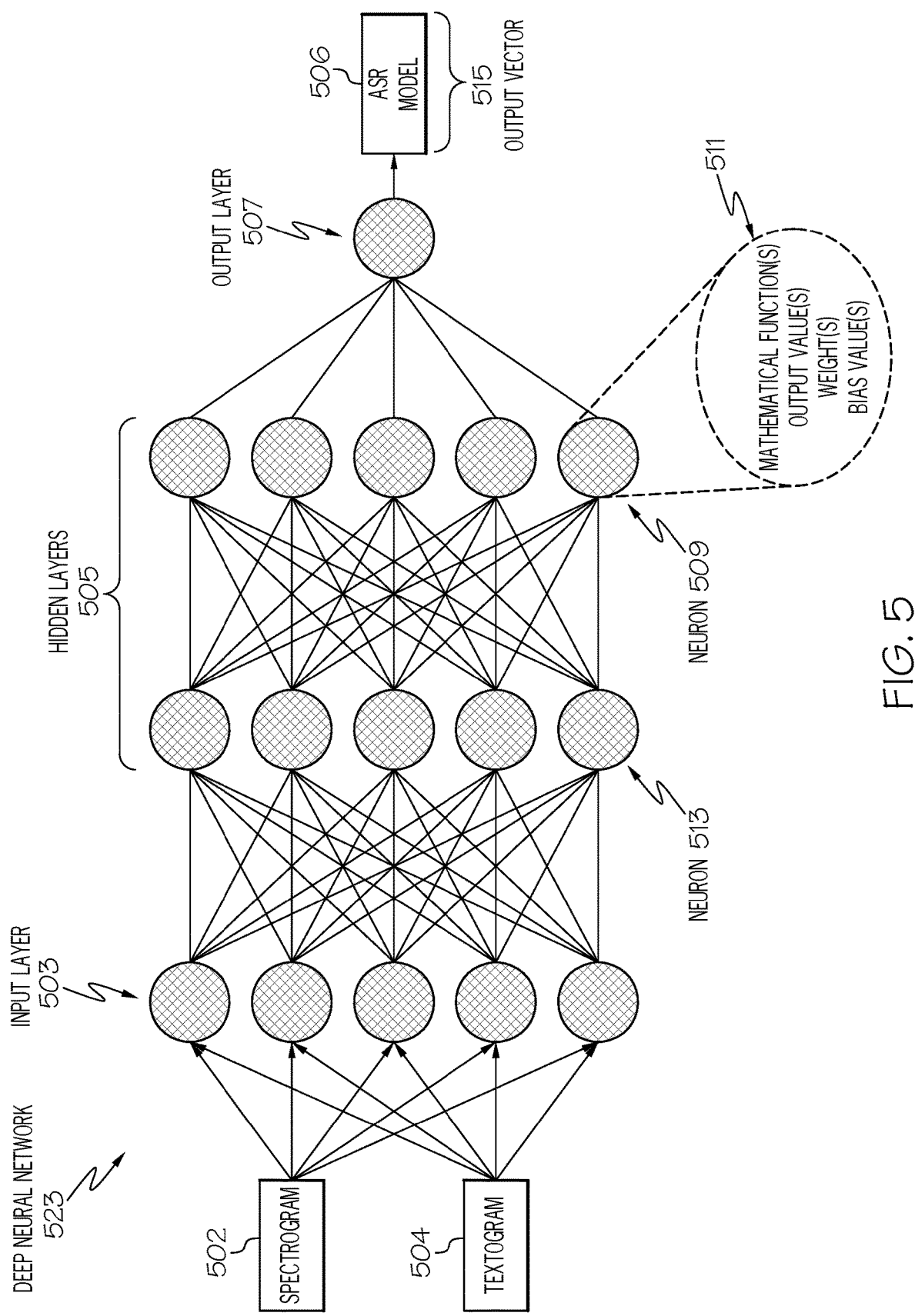
FIG. 5 depicts an overview of a deep neural network (DNN) that is used in one or more embodiments of the present invention.

With reference now to FIG. 5, one type of neural network used in one or more embodiments of the present invention is a deep neural network (DNN), such as the depicted deep neural network (DNN) 523 (analogous to the machine learning system 423 shown in FIG. 4), as shown in FIG. 5.

In one or more embodiments of the present invention, DNN 523 is used in one or more embodiments of the present invention when generating an ASR model 506.

In a deep neural network (DNN), neurons are arranged in layers, known as an input layer, hidden layer(s), and an output layer. The input layer includes neurons/nodes that take input data, and send it to a series of hidden layers of neurons, in which neurons from one layer in the hidden layers are interconnected with neurons in a next layer in the hidden layers. The final layer in the hidden layers then outputs a computational result to the output layer, which is often a single node for holding vector information.

With further reference now to FIG. 5, DNN 523 is used to generate an ASR model 506 based on an input of a spectrogram 502 and a textogram 504 (discussed above). Furthermore, the DNN 523 is trained to produce a known ASR model 506 by using various known instances of spectrogram 502 and textogram 504, and then adjusting the nodes to produce a known ASR model 506.

As shown in FIG. 5, the electronic neurons in DNN 523 are arranged in layers, known as the input layer 503, hidden layers 505, and an output layer 507. The input layer 503 includes neurons/nodes that take input data, and send it to a series of hidden layers of neurons (e.g., hidden layers 505), in which neurons from one layer in the hidden layers are interconnected with neurons in a next layer in the hidden layers 505. The final layer in the hidden layers 505 then outputs a computational result to the output layer 507, which is often a single node for holding vector information that describes the output vector 515 (e.g., the ASR model 506). In an embodiment of the present invention, each neuron in the output layer 507 is associated with a particular output vector 515.

As just mentioned, each node in the depicted DNN 523 represents an electronic neuron, such as the depicted neuron 509. Each node can be a processing unit (e.g., a microprocessor, a computer, etc.), another DNN, a convolutional neural network (CNN), a recurrent neural network (RNN), a quantum computer, etc. As shown in block 511, each neuron (including exemplary neuron 509) includes at least four features: a mathematical function, an output value, a weight, and a bias value.

The mathematical function is a mathematic formula for processing data from one or more upstream neurons. For example, assume that one or more of the neurons depicted in the middle hidden layers 505 sent data values to neuron 509. Neuron 509 then processes these data values by executing the mathematical function shown in block 511, in order to create one or more output values, which are then sent to another neuron, such as another neuron within the hidden layers 505 or a neuron in the output layer 507. Each neuron also has a weight that is specific for that neuron and/or for other connected neurons. Furthermore, the output value(s) are added to bias value(s), which increase or decrease the output value, allowing the DNN 511 to be further "finetuned".

For example, assume that neuron 513 is sending the results of its analysis of a piece of data to neuron 509. Neuron 509 has a first weight that defines how important data coming specifically from neuron 513 is. If the data is important, then data coming from neuron 513 is weighted heavily, and/or increased by the bias value, thus causing the mathematical function (s) within neuron 509 to generate a higher output, which will have a heavier impact on neuron(s) in the output layer 507. Similarly, if neuron 513 has been determined to be significant to the operations of neuron 509, then the weight in neuron 513 will be increased, such that neuron 509 receives a higher value for the output of the mathematical function in the neuron 513.

Alternatively, the output of neuron 509 can be minimized by decreasing the weight and/or bias used to affect the output of neuron 509. These weights/biases are adjustable for one, some, or all of the neurons in the DNN 523, such that a reliable output will result from output layer 507. Such adjustments are alternatively performed manually or automatically.

When manually adjusted, the weights and/or biases are adjusted by the user in a repeated manner until the output from output layer 507 matches expectations. For example, assume that DNN 523 is being trained to generate a particular ASR model 506. As such, when input layer 503 receives the inputs from a known spectrogram 502 and/or textogram 504, then DNN 523 (if properly trained by manually adjusting the mathematical function(s), output value(s), weight(s), and biases in one or more of the electronic neurons within DNN 523) outputs a correct output vector 515 to the output layer 507.

When automatically adjusted, the weights (and/or mathematical functions) are adjusted using "back propagation", in which weight values of the neurons are adjusted by using a "gradient descent" method that determines which direction each weight value should be adjusted to.

Figure 6:
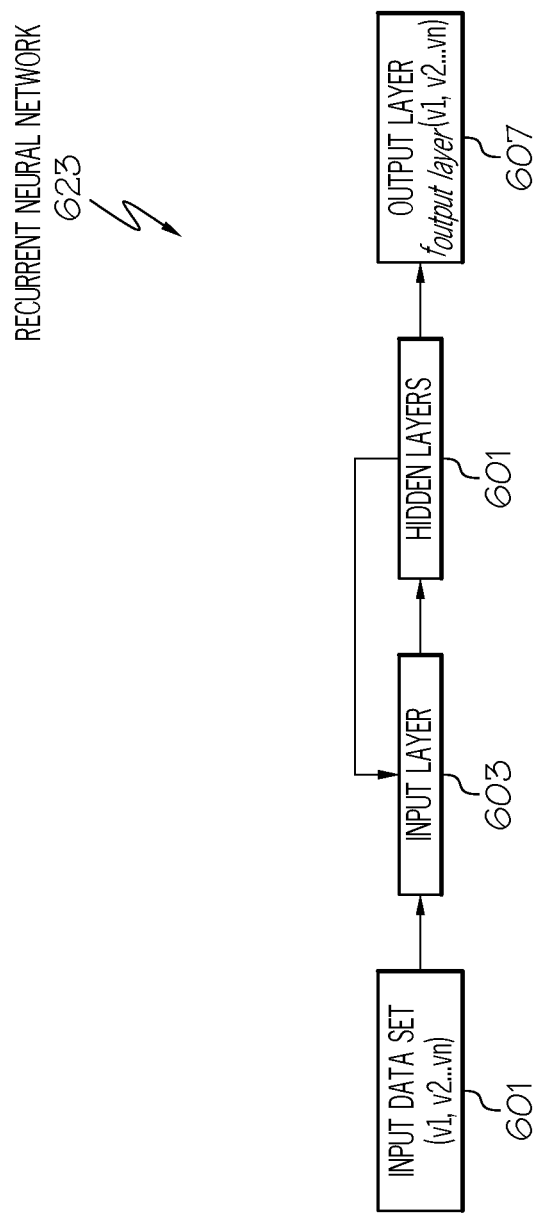
FIG. 6 illustrates an exemplary recurrent neural network (RNN) used in one or more embodiments of the present invention.

With reference now to FIG. 6, an exemplary Recurrent Neural Network (RNN) 623, which uses a form of back propagation, is used to generate adversarial objects vectors in one or more embodiments of the present invention.

As shown in FIG. 6, an input data set 601 is a series of vertex vectors (e.g., spectrogram 502 and/or textogram 504 shown in FIG. 5), depicted as v1, v2 . . . vn. Input data set 601 is entered into an input layer of RNN 623, which passes the data from input data set 601 to an input layer 603, and then on to hidden layers 605 for processing. As the name recurrent neural network infers, an output from the hidden layers 605 for a current vector (e.g., f(v₁)) is fed back to the input layer 603, such that the current output for the current vector f(v₁) is combined with a next input vector (e.g., v₂) to create a new output from the hidden layers 605 (e.g., f(v₁+v₂)). This process repeats until all vectors from the input data set 601 and their precursive processing results are processed, resulting in an output to the output layer 607, shown as $f^{output\ layer}(v_1, v_2 \ldots v_n)$.

Thus, FIG. 6 represents the foundational architecture of the RNN-T transducer ASR model 100 shown in FIG. 1, in which the output P(y|t,u) is fed back into the encoder network 101 and/or the prediction network 103 for further fine-tuning of the RNN-T transducer ASR model 100.

Figure 7:
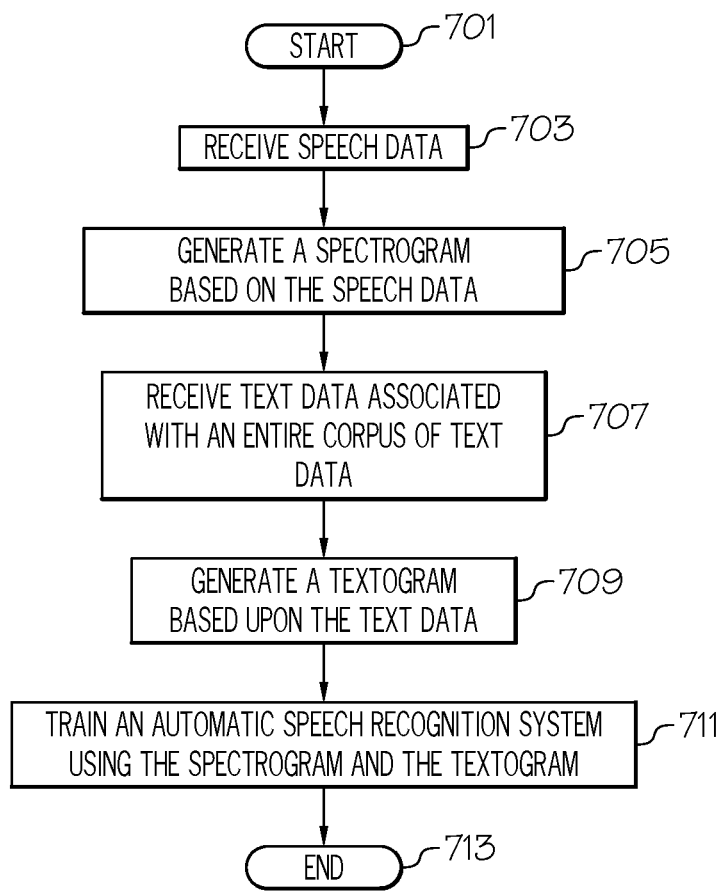
FIG. 7 is a high-level flow-chart of one or more operations performed in one or more embodiments of the present invention.

With reference now to FIG. 7, a high-level flow-chart of one or more operations performed in one or more embodiments of the present invention for training an automatic speech recognition system using speech data and text data is presented.

After initiator block 701, a computing device (e.g., computer 401 shown in FIG. 4) receives speech data (e.g., an audio file of speech), as described in block 703.

As described in block 705, the computing device generates a spectrogram based on the speech data.

As described in block 707, the computing device receives text data associated with an entire corpus of text data.

As described in block 709, the computing device generates a textogram based upon the text data, as illustrated in FIG. 2.

As described in block 711, the computing device trains an automatic speech recognition system (e.g., the RNN 623 shown in FIG. 6) using the spectrogram and the textogram.

The flow-chart ends at terminator block 713.

In one or more embodiments of the present invention, the method further comprises adapting, by the computing device, an automatic speech recognition (ASR) model into spoken language understanding (SLU) model using only text data without a corresponding spectrogram; and utilizing, by the computing device, the spoken language understanding model to interpret the speech data. That is, a base model (of speech) can be different from a new domain (brought by a new client) and needs to be adapted. As such and in one or more embodiments of the present invention, an ASR model is adapted into an SLU model by using text-only data (transcripts with SLU labels) without corresponding speech.

In one or more embodiments of the present invention, in which the speech data referenced in FIG. 7 is first speech data, the method further comprises modifying, by the computing device, the automatic speech recognition model with a second speech data that is different from the first speech data. That is, once the first RNN-T transducer ASR model 100 shown in FIG. 1 is created, it is further modified from different inputs $x_t$ and $y_{u-1}$ for other speech samples.

In one or more embodiments of the present invention, in which the speech data is first speech data, and the method further comprises modifying, by the computing device, the automatic speech recognition model with text data from a second speech data that is different from the first speech data. That is, once the first RNN-T transducer ASR model 100 shown in FIG. 1 is created, it is further modified from different text data that is generated by the RNN-T system from other speech samples.

In one or more embodiments of the present invention, in which the speech data is in a first speech language, and the method further comprises modifying, by the computing device, the automatic speech recognition model with text data from a second speech language that is different from the first speech language. That is, in one or more embodiments of the present invention the RNN-T transducer ASR model 100 is further trained to recognize foreign phrases, foreign languages, technical vernacular, etc.

In one or more embodiments of the present invention, the method further comprises modifying, by the computing device, the textogram based upon the speech data to create a modified textogram; and further training, by the computing device, the automatic speech recognition system using the spectrogram and the modified textogram. That is, the textogram that was generated based on the text data of the original speech data is modified by using different inputs $x_t$ and $y_{u-1}$ for other speech samples. This allows the system to recognize various speech samples.

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
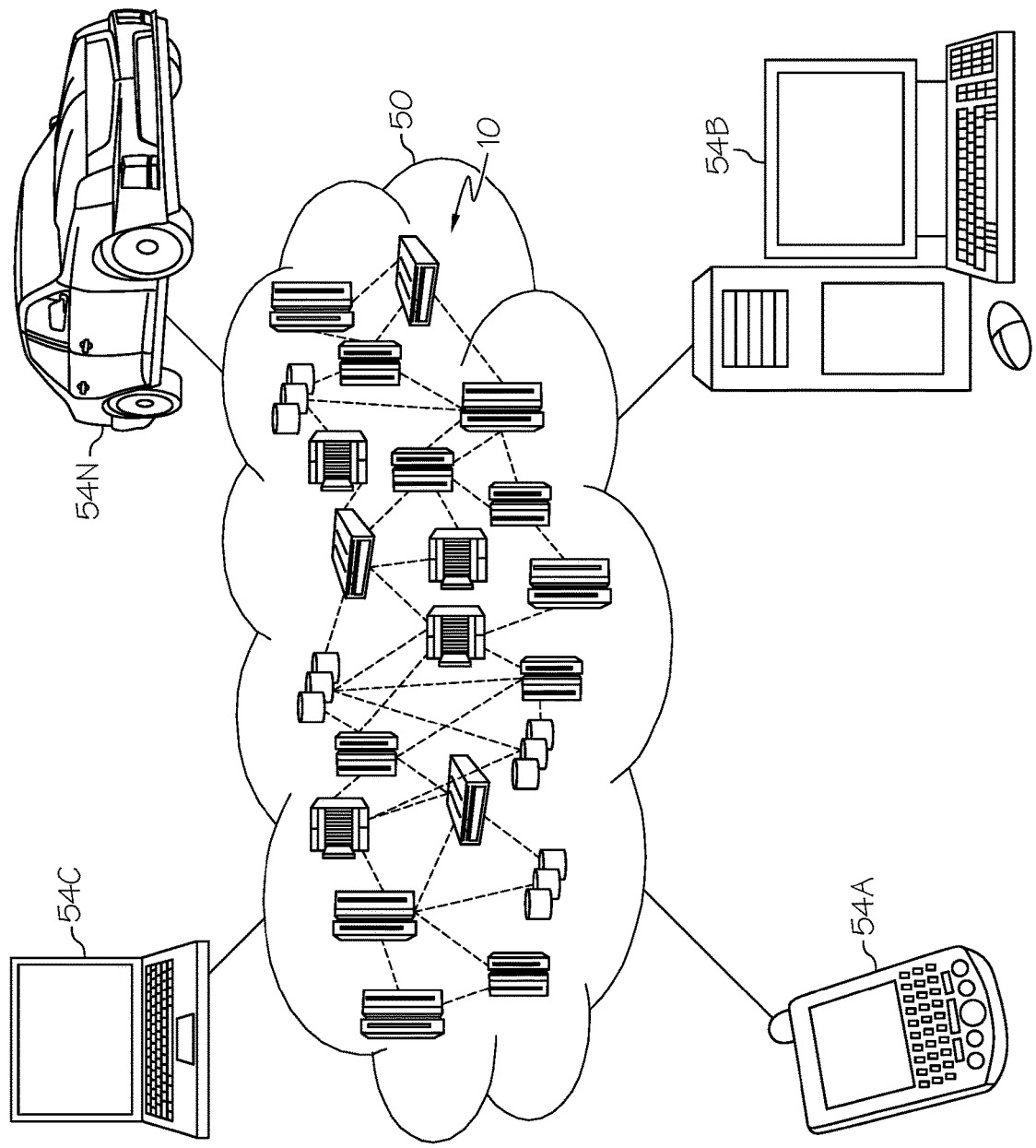
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 8 are intended to be illustrative only and that computing nodes 10 and cloud computing environment 50 can communicate with any type of computerized device over any type of network and/or network addressable connection (e.g., using a web browser).

Figure 9:
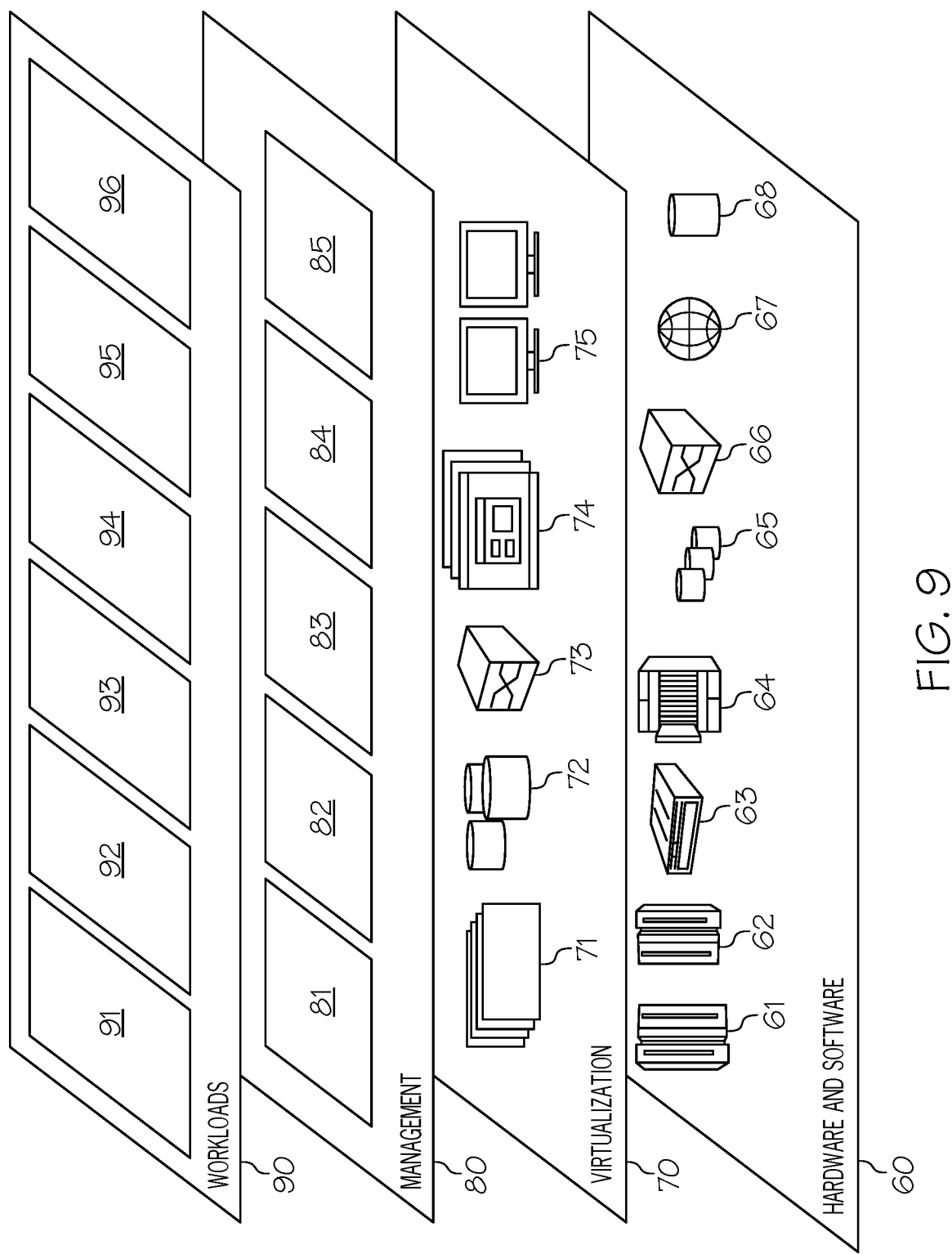
FIG. 9 depicts abstraction model layers of a cloud computer environment according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and automatic speech recognition processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of using a computing device to train an automatic speech recognition system using speech data and text data, the method comprising:

receiving, by a computing device, speech data;
generating, by the computing device, a spectrogram based on the speech data;
receiving, by the computing device, text data associated with an entire corpus of text data;
generating, by the computing device, a textogram based upon the text data; and
training, by the computing device, an automatic speech recognition system using the spectrogram and the textogram.

2. The method of claim 1, further comprising:
adapting, by the computing device, an automatic speech recognition model into a spoken language understanding model using only text data without a corresponding spectrogram; and
utilizing, by the computing device, the spoken language understanding model to interpret the speech data.

3. The method of claim 1, wherein the speech data is first speech data, and wherein the method further comprises:
modifying, by the computing device, the automatic speech recognition model with a second speech data that is different from the first speech data.

4. The method of claim 1, wherein the speech data is first speech data, and wherein the method further comprises:
modifying, by the computing device, the automatic speech recognition model with text data from a second speech data that is different from the first speech data.

5. The method of claim 1, wherein the speech data is in a first speech language, and wherein the method further comprises:
modifying, by the computing device, the automatic speech recognition model with text data from a second speech language that is different from the first speech language.

6. The method of claim 1, wherein the automatic speech recognition system is based on an automatic speech recognition model of the speech data, and wherein the method further comprises:
modifying, by the computing device, the automatic speech recognition model using independent text data that is different from text data associated with the speech data.

7. A computer program product for training an automatic speech recognition system using speech data and text data, wherein the computer program product comprises a non-transitory computer readable storage device having program instructions embodied therewith, the program instructions readable and executable by a computer to perform a method comprising:
receiving speech data;
generating a spectrogram based on the speech data;
receiving text data associated with an entire corpus of text data;
generating a textogram based upon the text data; and
training an automatic speech recognition system using the spectrogram and the textogram.

8. The computer program product of claim 7, wherein the method further comprises:
adapting an automatic speech recognition model into a spoken language understanding model using only text data without a corresponding spectrogram; and
utilizing the spoken language understanding model to interpret the speech data.

9. The computer program product of claim 7, wherein the speech data is first speech data, and wherein the method further comprises:
modifying the automatic speech recognition model with a second speech data that is different from the first speech data.

10. The computer program product of claim 7, wherein the speech data is first speech data, and wherein the method further comprises:
modifying the automatic speech recognition model with text data from a second speech data that is different from the first speech data.

11. The computer program product of claim 7, wherein the speech data is in a first speech language, and wherein the method further comprises:
modifying the automatic speech recognition model with text data from a second speech language that is different from the first speech language.

12. The computer program product of claim 7, wherein the automatic speech recognition system is based on an automatic speech recognition model of the speech data, and wherein the method further comprises:
modifying the automatic speech recognition model using independent text data that is different from text data associated with the speech data.

13. The computer program product of claim 7, wherein the program code is provided as a service in a cloud environment.

14. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
receiving speech data;
generating a spectrogram based on the speech data;
receiving text data associated with an entire corpus of text data;
generating a textogram based upon the text data; and
training an automatic speech recognition system using the spectrogram and the textogram.

15. The computer system of claim 14, wherein the method further comprises:
adapting an automatic speech recognition model into a spoken language understanding model using only text data without a corresponding spectrogram; and
utilizing the spoken language understanding model to interpret the speech data.

16. The computer system of claim 14, wherein the speech data is first speech data, and wherein the method further comprises:
modifying the automatic speech recognition model with a second speech data that is different from the first speech data.

17. The computer system of claim 14, wherein the speech data is first speech data, and wherein the method further comprises:
modifying the automatic speech recognition model with text data from a second speech data that is different from the first speech data.

18. The computer system of claim 14, wherein the speech data is in a first speech language, and wherein the method further comprises:
modifying the automatic speech recognition model with text data from a second speech language that is different from the first speech language.

19. The computer system of claim 14, wherein the automatic speech recognition system is based on an automatic speech recognition model of the speech data, and wherein the method further comprises:

modifying the automatic speech recognition model using independent text data that is different from text data associated with the speech data.

20. The computer system of claim 14, wherein the program code is provided as a service in a cloud environment.

* * * * *